US012792992B2

(12) United States Patent
Paini et al.

(10) Patent No.: US 12,792,992 B2
(45) Date of Patent: Nov. 10, 2026

(54) SYSTEM FOR INTELLIGENT WORKFLOW MANAGEMENT IN ROBOTIC PROCESS AUTOMATION

(71) Applicant: BANK OF AMERICA CORPORATION, Charlotte, NC (US)

(72) Inventors: Siva Kumar Paini, Hyderabad (IN); Sudhakar Balu, Madipakkam (IN); Sathya Thamilarasan, Theni (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 161 days.

(21) Appl. No.: 18/372,199

(22) Filed: Sep. 25, 2023

(65) Prior Publication Data

US 2025/0103986 A1 Mar. 27, 2025

(51) Int. Cl.

*G06Q 10/0631* (2023.01)
*B25J 9/16* (2006.01)
*G06Q 10/0635* (2023.01)

(52) U.S. Cl.

CPC ...... *G06Q 10/06316* (2013.01); *B25J 9/1602* (2013.01); *B25J 9/163* (2013.01); *G06Q 10/0635* (2013.01)

(58) Field of Classification Search

None
See application file for complete search history.

(56) References Cited

U.S. PATENT DOCUMENTS 11,433,536 B2 9/2022 Berg
11,494,291 B2 11/2022 Stocker
(Continued)

FOREIGN PATENT DOCUMENTS

JP 2022177032 A 11/2022
JP 2023070148 A * 5/2023 ......... G05B 19/0426
(Continued)

OTHER PUBLICATIONS

Lubis, "Driving Digital Transformation: Leveraging Robotic Process Automation (RPA) to Enhance Business Process Efficiency and Reducing Manual Errors," 2023, IEEE International Conference on Data and Software Engineering, Toba, Indonesia, 979-8-3503-8138-2/23, DOI10:1109/ICODSE59534.2023.10291662 (Year: 2023).*

*Primary Examiner* — Mehmet Yesildag
*Assistant Examiner* — Michael Borowski
(74) *Attorney, Agent, or Firm* — Moore & Van Allen PLLC; Nicholas C. Russell

(57) ABSTRACT

Systems, computer program products, and methods are described herein for intelligent workflow management in robotic process automation (RPA). The present disclosure comprises a workflow replication subsystem configured to replicate a sequence of actions executed by an RPA bot in an application server; a fog computing subsystem operatively coupled to the workflow replication subsystem, wherein the fog computing subsystem is configured to extract metadata associated with execution of the sequence of actions; and an anomaly resolution subsystem operatively coupled to the fog computing subsystem and the workflow replication subsystem, wherein the anomaly resolution subsystem is configured to troubleshoot instances of interruptions in the execution of the sequence of actions, wherein the instances of interruptions comprise at least potential failures in at least one action yet to be executed by the RPA bot.

15 Claims, 7 Drawing Sheets

(56) References Cited

U.S. PATENT DOCUMENTS

| | | | | |
|---|---|---|---|---|
| 11,507,772 | B2 | 11/2022 | Berg | |
| 11,513,886 | B2 | 11/2022 | Iyer | |
| 11,593,709 | B2 | 2/2023 | Singh | |
| 11,642,788 | B2 * | 5/2023 | Geffen | B25J 9/1674 718/102 |
| 11,738,453 | B2 | 8/2023 | Shrivastava | |
| 11,789,853 | B2 | 10/2023 | Stocker | |
| 11,947,443 | B2 | 4/2024 | Stan | |
| 2019/0155225 | A1 | 5/2019 | Kothandaraman | |
| 2022/0075605 | A1 | 3/2022 | Iyer | |
| 2022/0187847 | A1 * | 6/2022 | Cella | G05B 19/41885 |
| 2022/0197249 | A1 | 6/2022 | Ma | |
| 2023/0169399 | A1 | 6/2023 | Cali | |
| 2023/0202033 | A1 | 6/2023 | Mimun | |
| 2023/0286168 | A1 | 9/2023 | Singh | |
| 2023/0297488 | A1 | 9/2023 | Kadakia | |
| 2023/0367702 | A1 | 11/2023 | Stocker | |
| 2024/0061760 | A1 | 2/2024 | Singh | |

FOREIGN PATENT DOCUMENTS

| | | | |
|---|---|---|---|
| WO | 2021076209 | A1 | 4/2021 |
| WO | 2023173560 | A1 | 9/2023 |
| WO | 2023237533 | A1 | 12/2023 |

* cited by examiner

SYSTEM FOR INTELLIGENT WORKFLOW MANAGEMENT IN ROBOTIC PROCESS AUTOMATION

TECHNOLOGICAL FIELD

Example embodiments of the present disclosure relate to workflow management in robotic process automation (RPA).

BACKGROUND

In traditional setups, RPA bots are developed and tested in lower environments like development, testing, and staging, which often do not accurately mirror the production environment. This discrepancy can lead to bot failures when deployed in production, making troubleshooting a complex and time-consuming task. The challenges are exacerbated by the lack of synchronized data and controls between lower and production environments. Additionally, real-time monitoring and preemptive action for bot failures are often lacking.

Applicant has identified a number of deficiencies and problems associated with workflow management in RPA. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for intelligent workflow management in robotic process automation (RPA).

In one aspect, a system for intelligent workflow management in robotic process automation (RPA) is presented. The system comprising: a workflow replication subsystem configured to replicate a sequence of actions executed by an RPA bot in an application server; a fog computing subsystem operatively coupled to the workflow replication subsystem, wherein the fog computing subsystem is configured to extract metadata associated with execution of the sequence of actions; and an anomaly resolution subsystem operatively coupled to the fog computing subsystem and the workflow replication subsystem, wherein the anomaly resolution subsystem is configured to troubleshoot instances of interruptions in the execution of the sequence of actions, wherein the instances of interruptions comprise at least potential failures in at least one action yet to be executed by the RPA bot.

In some embodiments, the system further comprises an interruption recordation subsystem operative coupled to the application server, wherein the interruption recordation subsystem is configured to: determine instances of interruptions in the execution of the sequence of actions by the RPA bot; extract information associated with the instances of interruptions; and store the information associated with the instances of interruptions in a vector database.

In some embodiments, the system further comprises an interruption prediction subsystem operatively coupled to the interruption recordation subsystem, the interruption recordation subsystem comprising a machine learning (ML) subsystem configured to: access the information associated with the instances of interruptions stored in the vector database; analyze the accessed information to identify patterns indicative of potential failures in the execution of the sequence of actions by the RPA bot; and output a predictive alert comprising the identified patterns indicative of the potential failures associated with the at least one action yet to be executed by the RPA bot.

In some embodiments, the system further comprises a self-healing subsystem operatively coupled to the interruption prediction subsystem, wherein the self-healing subsystem is configured to: temporarily pause the RPA bot; automatically implement pre-defined actions on the application server to remedy the potential failures associated with the at least one action yet to be executed by the RPA bot; and resume the RPA bot upon implementing the pre-defined actions.

In some embodiments, the interruption prediction subsystem is configured to transmit control signals configured to cause a user input device to display the predictive alert for manual intervention.

In some embodiments, the system further comprises a workflow optimization subsystem operatively coupled to the interruption prediction subsystem and the workflow replication subsystem, wherein the workflow optimization subsystem is further configured to: receive the sequence of actions that the RPA bot is configured to execute; receive information associated with the potential failure associated with the at least one action yet to be executed by the RPA bot; identify a specific location within the sequence of actions where the at least one action associated with the potential failure is situated; divide the sequence of actions into at least two distinct components, wherein a first component comprises a sequence of actions up to and including the at least one action associated with the potential failure, and a second component comprises a sequence of actions subsequent to the at least one action; and output the first component and the second component for further processing to the anomaly resolution subsystem to isolate and remedy the potential failure in the at least one action.

In some embodiments, the anomaly resolution subsystem is further configured to: determine remedial actions configured to remedy the potential failures associated with the at least one action yet to be executed by the RPA bot; simulate execution of the remedial actions in the workflow replication subsystem; determine whether the execution of the remedial actions remedy the potential failures associated with the at least one action yet to be executed by the RPA bot; generate a server update based on at least the remedial actions; and deploy the server update to the application server.

In another aspect, a method for intelligent workflow management in robotic process automation (RPA) is presented. The method comprising: receiving, from an application server, information associated with an execution of a sequence of actions by an RPA bot on the application server; determining instances of interruptions in the execution of the sequence of actions, wherein the instances of interruptions comprise at least potential failures in at least one action yet to be executed by the RPA bot; extracting, using a fog computing subsystem, metadata associated with the execution of the sequence of actions, wherein the metadata comprises information associated with the instances of interruptions; simulating, using a workflow replication subsystem, a replication of the sequence of actions, wherein the replication of the sequence of actions comprises a replication of the instances of interruption; and troubleshooting, using an anomaly resolution subsystem, instances of interruptions in the execution of the sequence of actions based on at least simulating the replication of the sequence of actions.

In yet another aspect, a computer program product for intelligent workflow management in robotic process automation (RPA) is presented. The computer program product comprising a non-transitory computer-readable medium comprising code configured to cause an apparatus to: receive, from an application server, information associated with an execution of a sequence of actions by an RPA bot on the application server; determine instances of interruptions in the execution of the sequence of actions, wherein the instances of interruptions comprise at least potential failures in at least one action yet to be executed by the RPA bot; extract, using a fog computing subsystem, metadata associated with the execution of the sequence of actions, wherein the metadata comprises information associated with the instances of interruptions; simulate, using a workflow replication subsystem, a replication of the sequence of actions, wherein the replication of the sequence of actions comprises a replication of the instances of interruption; and troubleshoot, using an anomaly resolution subsystem, instances of interruptions in the execution of the sequence of actions based on at least simulating the replication of the sequence of actions.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
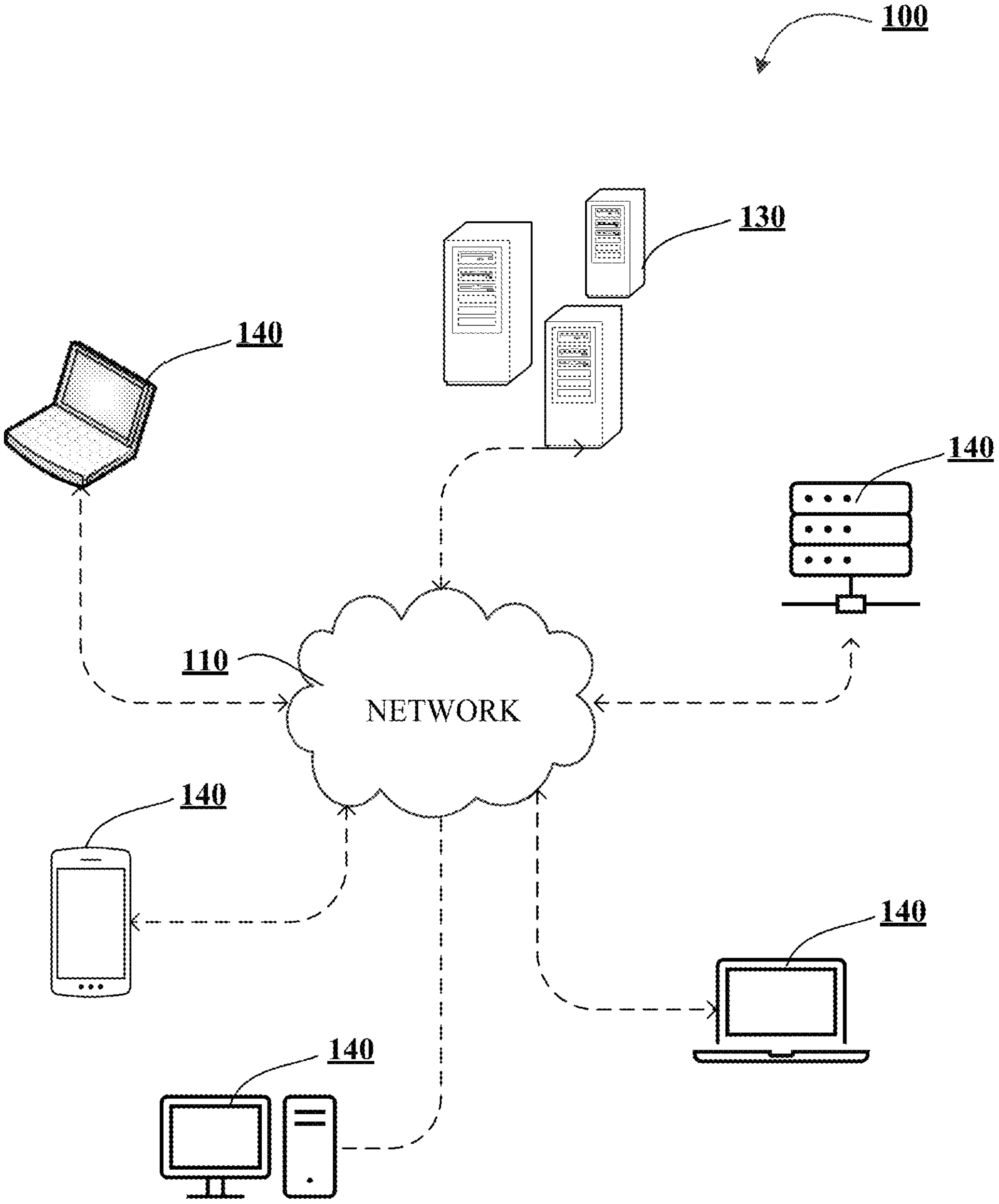
Figure 1B:
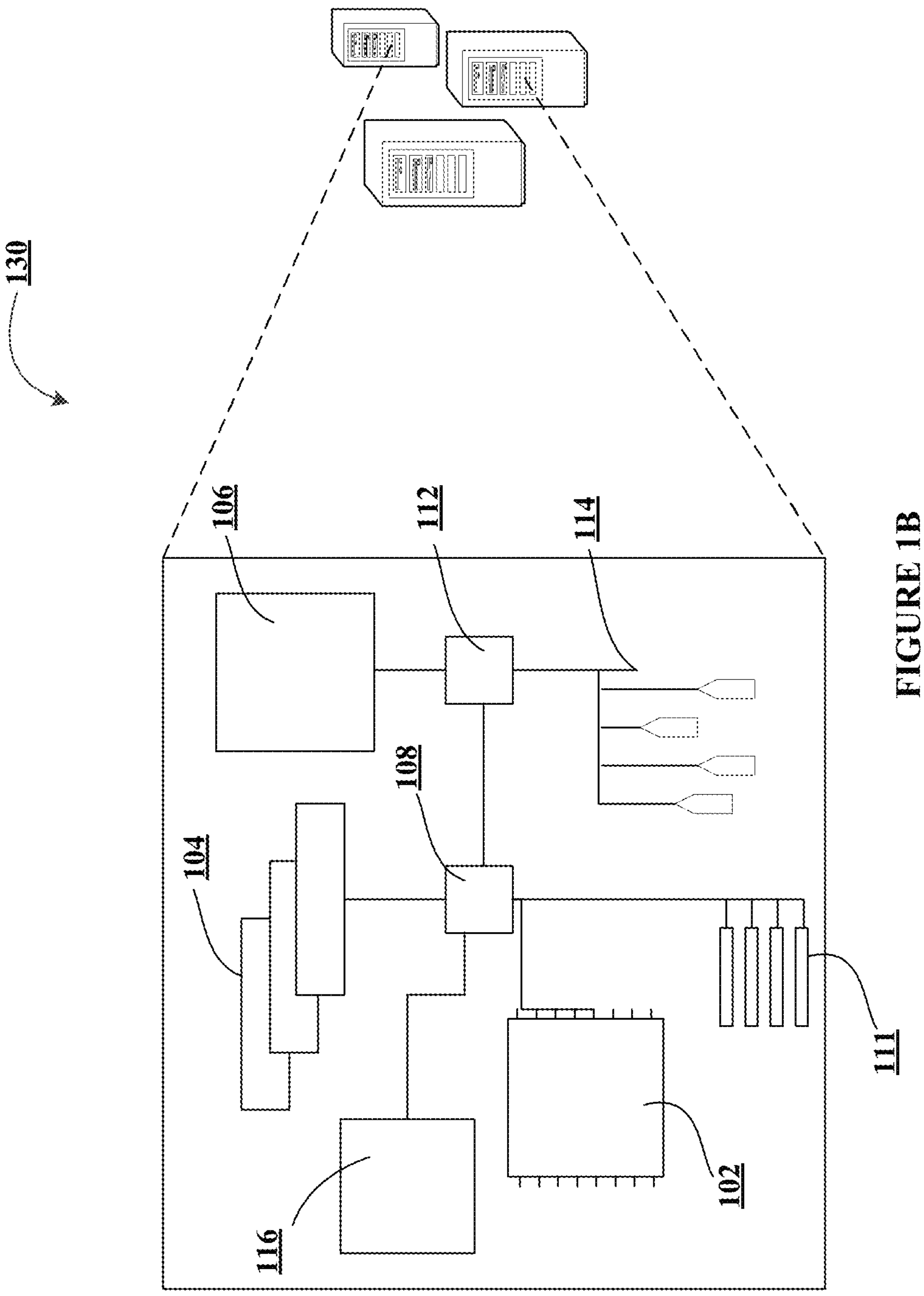
Figure 1C:
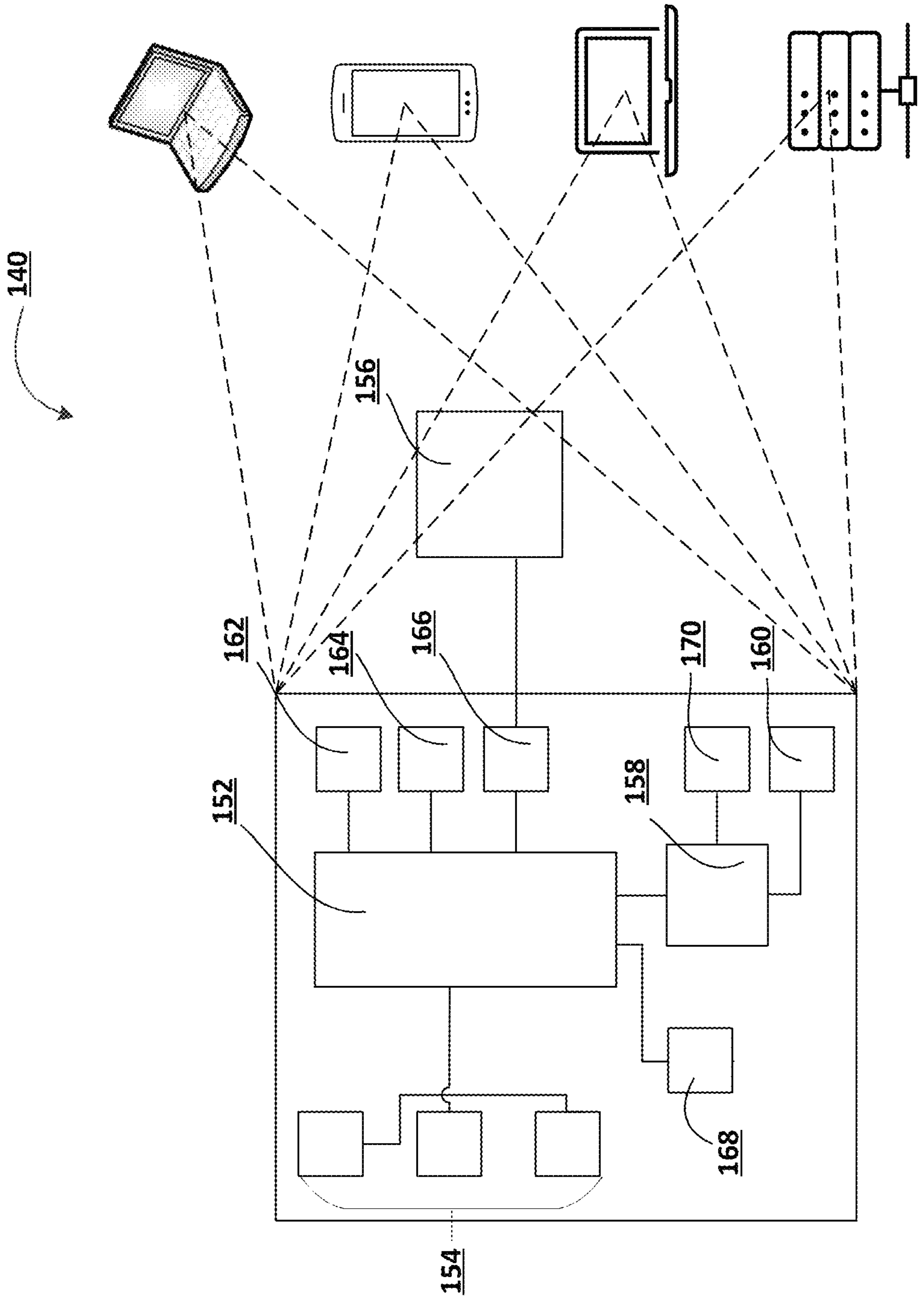
Figure 2:
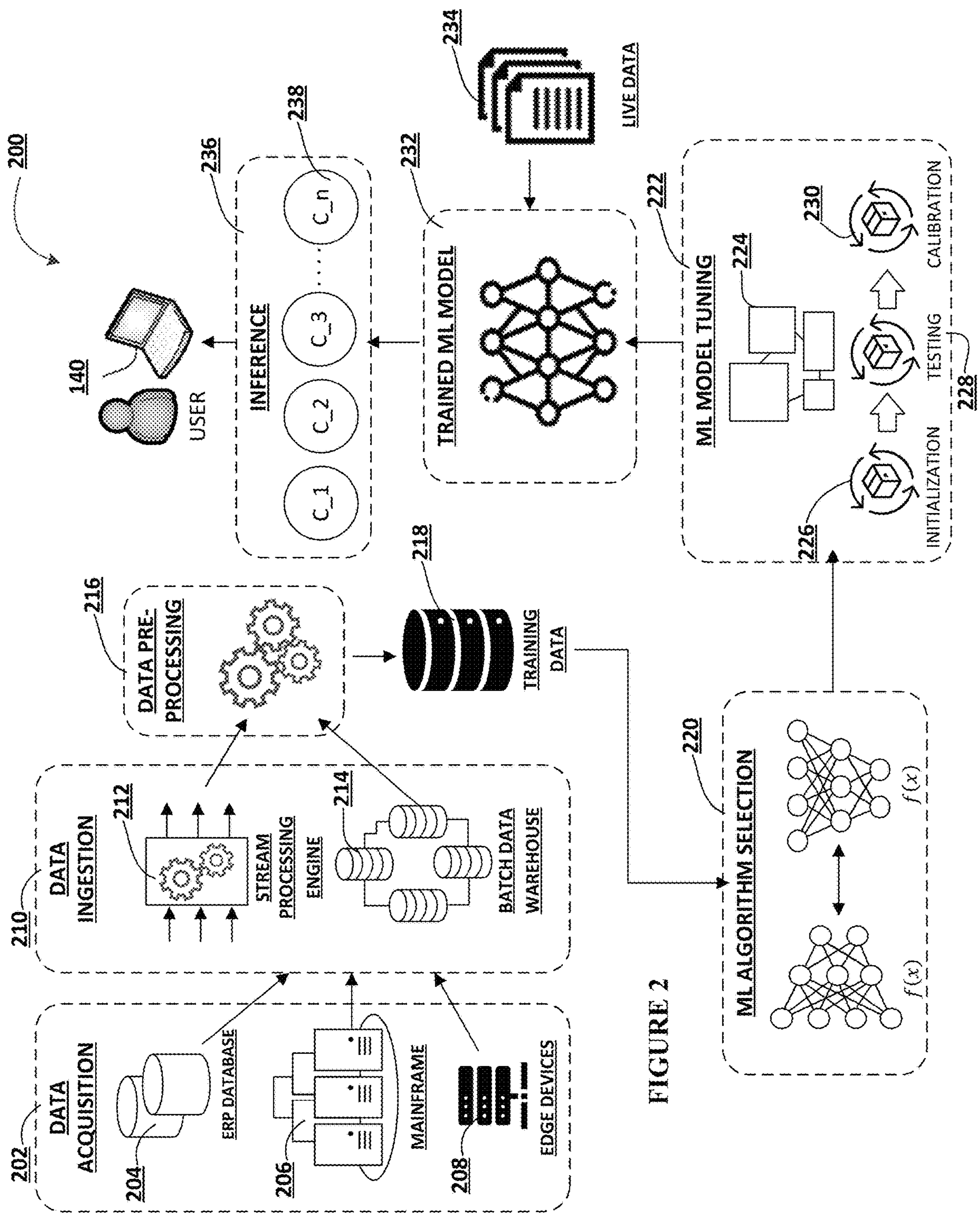
Figure 3:
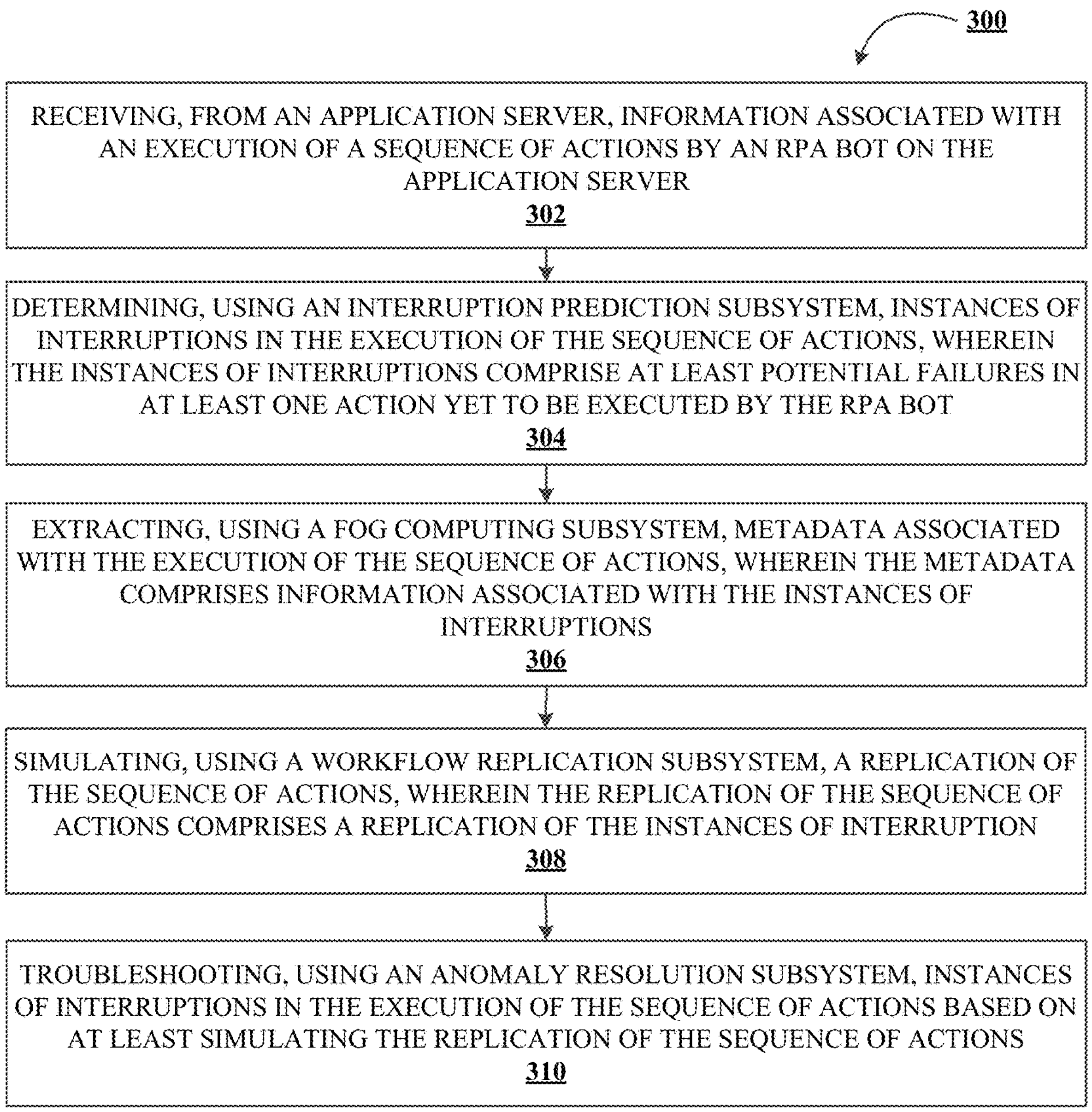
Figure 4:
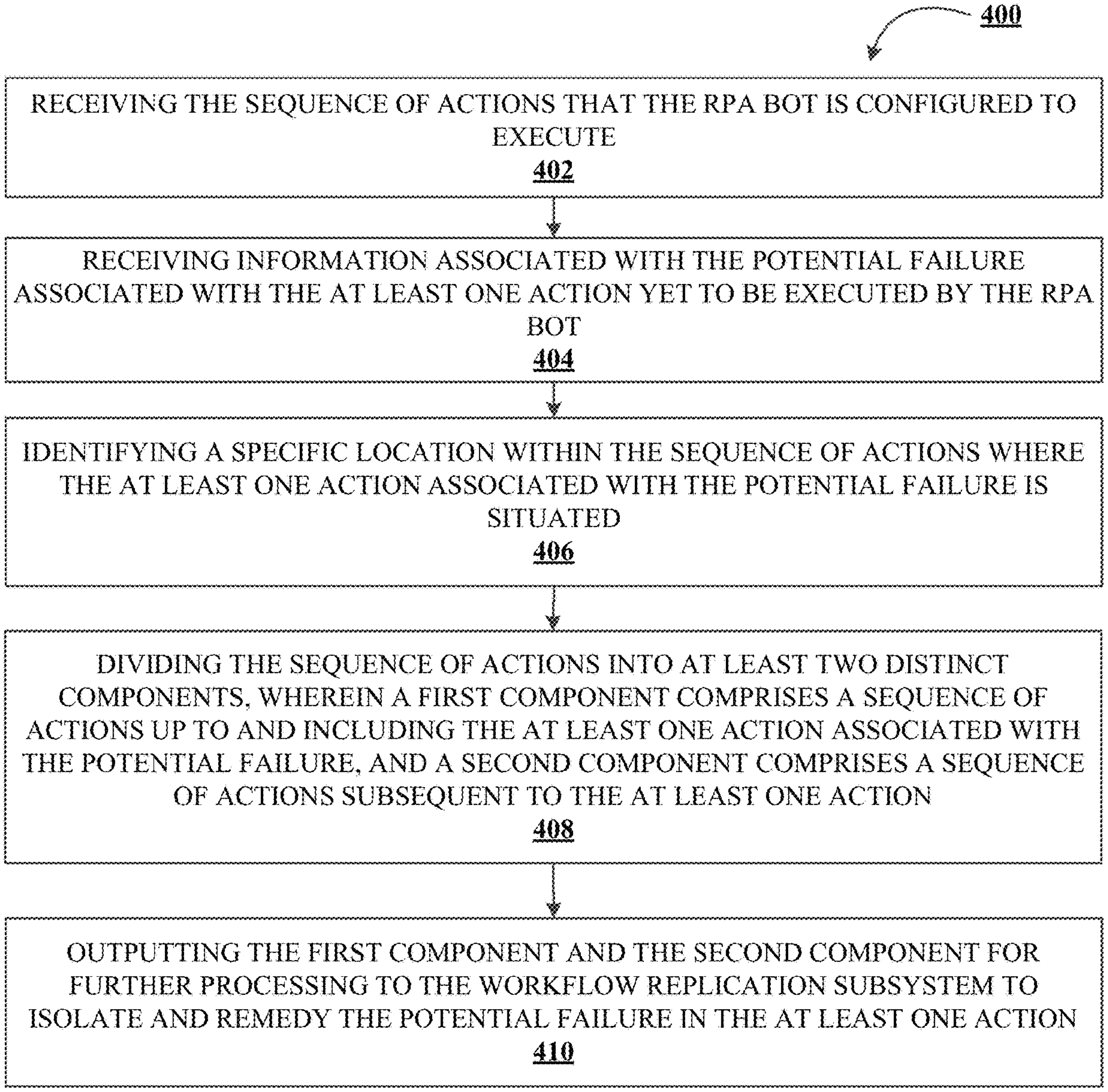
Figure 5:
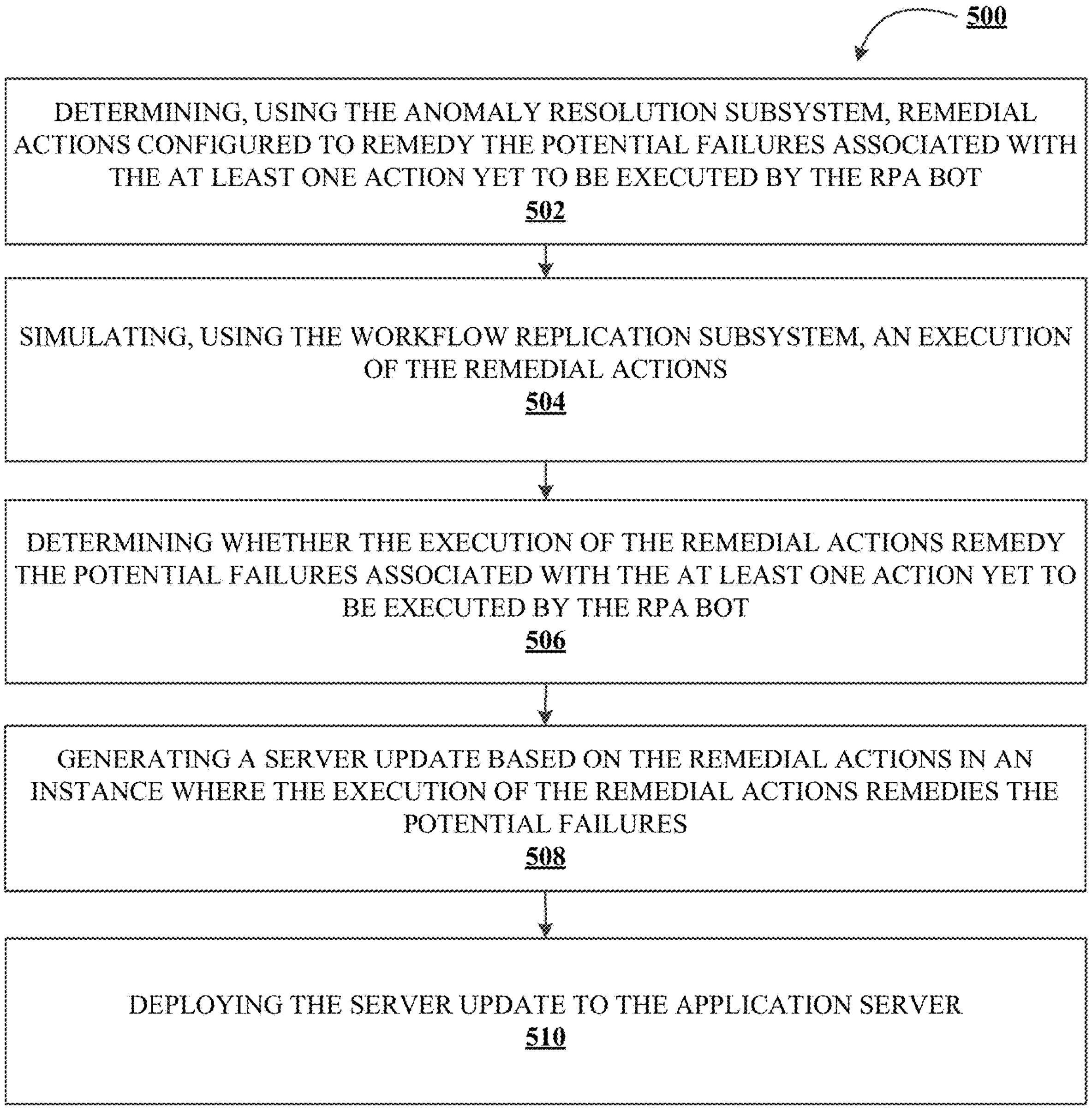

FIGS. 1A-1C illustrates technical components of an exemplary distributed computing environment for intelligent workflow management in robotic process automation (RPA), in accordance with an embodiment of the disclosure;

FIG. 2 illustrates an exemplary machine learning (ML) subsystem architecture, in accordance with an embodiment of the invention;

FIG. 3 illustrates a process flow for intelligent workflow management in RPA, in accordance with an embodiment of the disclosure;

FIG. 3 illustrates a process flow 300 for intelligent workflow management in RPA, in accordance with an embodiment of the disclosure;

FIG. 4 illustrates a process flow 400 for isolating a potential failure using a workflow replication subsystem; and FIG. 5 illustrates a process flow 500 for generating and subsequently deploying a server update to the application server, in accordance with an embodiment of the invention.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a “user interface” may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, “authentication credentials” may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In conventional robotic process automation (RPA) systems, the execution of workflows often suffers from interruptions and failures that are not adequately addressed in real-time. These disruptions can arise due to discrepancies between development, testing, and production environments, making it challenging to predict and prevent issues before they occur in a live setting. Conventional systems lack the capability to replicate workflows precisely, troubleshoot interruptions effectively, and forecast potential failures. Moreover, there is an absence of real-time data analysis and decision-making capabilities, which further exacerbates the problem. These limitations often result in increased operational downtime, reduced efficiency, and higher costs for troubleshooting and maintenance.

The present invention addresses these challenges by providing a system for intelligent workflow management in robotic process automation (RPA). The system may include an application server with an RPA bot configured to execute a sequence of actions. A workflow replication subsystem may be designed to replicate these actions, while a fog computing subsystem may extract metadata associated with the execution. An anomaly resolution subsystem may troubleshoot instances of interruptions in the RPA bot's actions. Additional subsystems may include an interruption recordation subsystem that stores information related to interruptions in a vector database, an interruption prediction subsystem with a machine learning subsystem for forecasting potential failures, and a self-healing module that implements pre-defined actions to remedy these failures. The system also features a workflow optimization subsystem that divides the workflow based on predicted failures, thereby enhancing the efficiency and reliability of RPA deployments.

The present invention introduces several technical improvements to address the limitations of existing robotic process automation (RPA) systems. By leveraging the fog computing subsystem, the system facilitates faster data analysis and processing, thereby reducing latency and enhancing real-time decision-making capabilities. Furthermore, the fog computing subsystem enhances data efficiency by reducing the volume of data that needs to be sent to a centralized cloud, thus conserving bandwidth and computational resources. What is more, the localized data processing enabled by the fog computing subsystem ensures better compliance and security measures, allowing sensitive data to be processed locally rather than being sent to a remote data center. The workflow optimization subsystem performs intelligent analysis of various types of metadata, such as screen recordings, logs, and events, to logically divide complex workflows into partial or full executions, optimizing resource utilization. In addition, the system incorporates proactive monitoring features through the interruption prediction subsystem and anomaly resolution subsystem, which provide real-time alerts and initiate various operations, enabling either human intervention or automated corrections before a bot failure occurs. These improvements collectively contribute to a more efficient, reliable, and secure RPA deployment. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for intelligent workflow management in RPA 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate.

The processor 102 may include or be operatively coupled to a number of subsystems to execute the portions of processes described herein. A subsystem may refer to a distinct functional unit within a system, designed to perform a specific function or set of functions. In various embodiments, a subsystem may comprise both hardware and software components that work in concert to achieve the designated tasks. For example, in some embodiments, a "subsystem" may include processing circuitry, algorithms, routines, storage media, network interfaces, input/output mechanisms, and the like. In some embodiments, each subsystem may include one or more units, each designed to perform a specific function or set of functions within the broader scope of the subsystem's objectives. These units may utilize the processing circuitry, algorithms, routines, storage media, network interfaces, and input/output mechanisms associated with the subsystem to execute their designated tasks. In some embodiments, subsystem may operate independently or in conjunction with other subsystems to achieve system-wide objectives. In some cases, similar or common hardware may be shared across multiple subsystems, obviating the need for duplicate hardware. Components of a subsystem may be housed together or separately, depending on system architecture and functional requirements.

As described in further detail herein, in example embodiments, the processor 102 may include or be operatively coupled to, (i) a workflow replication subsystem—the workflow replication subsystem may be responsible for duplicating the sequence of actions executed by the RPA bot in the application server, serving as a testing ground for validating the workflow before it is deployed in a live environment. By replicating the workflow, the workflow replication subsystem may aid in identifying and troubleshooting potential issues, (ii) a fog computing subsystem—the fog computing subsystem may facilitate real-time data analysis and processing by operating closer to the data source, thereby reducing latency and enhancing the system's real-time decision-making capabilities. Additionally, the fog computing subsystem may minimize the volume of data sent to a centralized cloud, conserving bandwidth and computational resources, (iii) an anomaly resolution subsystem—the anomaly resolution subsystem may be designed to troubleshoot instances of interruptions in the execution of the RPA bot's actions. The anomaly resolution subsystem may work in tandem with the fog computing subsystem and the workflow replication subsystem to identify and resolve issues. The anomaly resolution subsystem may be used to maintain smooth operation of the overall system by addressing disruptions as they occur, (iv) an interruption recordation subsystem—the interruption recordation subsystem may determine instances of interruptions in the RPA bot's actions and extract relevant information. The extracted information may then be stored in a vector database for future analysis and troubleshooting. The stored data serves as a valuable resource for understanding the nature and frequency of interruptions, (v) an interruption prediction subsystem—the interruption prediction subsystem may forecast potential failures in the RPA bot's actions by using data from the interruption recordation subsystem to analyze patterns and predict possible interruptions. The interruption prediction subsystem may output predictive alerts, enabling preemptive action to be taken, (vi) a machine learning (ML) subsystem-integrated within the interruption prediction subsystem, the ML subsystem may use ML algorithms to analyze stored interruption data. The ML subsystem may identify patterns indicative of potential failures and refines its predictive models over time. In this way, the ML subsystem may enhance the accuracy and reliability of the system's predictive capabilities, (vii) a self-healing subsystem—the self-healing subsystem may be configured to automatically implement pre-defined actions to remedy potential failures in the RPA bot's actions. In example implementations, the self-healing subsystem may temporarily pause the RPA bot, apply the corrective measures, and then resume the bot's operation. This automated process minimizes downtime and enhances the system's overall reliability, and (viii) a workflow optimization subsystem—the workflow optimization subsystem may receive the sequence of actions that the RPA bot is configured to execute and identify specific locations where potential failures are predicted. Then, the workflow optimization subsystem may divide the sequence into distinct components based on these identified locations. Then, the workflow optimization subsystem may output the divided components for further processing, thereby optimizing resource utilization and improving the system's efficiency.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for intelligent workflow management in RPA, in accordance with an embodiment of the disclosure. As shown in block 302, the process flow includes receiving, from an application server, information associated with an execution of a sequence of actions by an RPA bot on the application server. In some embodiments, a sequence of actions may include a set of predefined tasks or operations that the RPA bot may be programmed to perform. These actions could range from simple actions like data entry or file transfers to more complex operations like data analysis or decision-making based on certain conditions. In some embodiments, the information associated with the execution of the sequence of actions by the RPA bot may include various types of data that could be generated or used during the RPA bot's operation, such as metadata like timestamps, status codes, or error messages, as well as more substantive data like video recordings of the actions being executed, including various inputs and outputs for each action in the sequence. Such information may be used to monitor the bot's performance, troubleshooting issues, and optimize future operations. By receiving this information from the application server, the system may gain the necessary context to understand how the RPA bot is functioning.

As shown in block 304, the process flow includes determining instances of interruptions in the execution of the sequence of actions, wherein the instances of interruptions comprise at least potential failures in at least one action yet to be executed by the RPA bot.

In some embodiments, the process of determining instances of interruptions may involve continuous or periodic monitoring of the sequence of actions executed by the RPA bot. Such monitoring could be real-time or near-real-time to capture any disruptions or anomalies as they occur. The scope of what constitutes a disruption or anomaly could vary widely, ranging from minor delays in the execution timeline to complete halts where the RPA bot ceases to function as expected. To facilitate this monitoring, various metrics or indicators may be employed. In example embodiments, error codes may serve as immediate flags for issues in the system, signaling that a particular action did not execute as intended, time delays may be measured against predefined benchmarks to identify actions that are taking longer than expected to complete, potentially indicating a bottleneck or inefficiency in the system, unexpected outputs, such as data that does not match expected formats or values, may also serve as indicators of interruptions. These metrics or indicators are not mutually exclusive and could be used in combination to provide a more comprehensive understanding of the system's performance. By employing a multi-faceted approach to identify interruptions, the system can more accurately diagnose issues, enabling more effective troubleshooting and resolution strategies.

In some embodiments, the system may include an interruption recordation subsystem specifically designed for the task of identifying and documenting instances of interruptions in the RPA bot's sequence of actions. Once an interruption is determined, the subsystem may also extract relevant information associated with these instances. Such extraction may involve capturing specific data points or metadata such as the action where the interruption occurred, the time of occurrence, a video recording of the interruption, the nature of the error, or any other relevant parameters.

Upon extracting the instances, the extracted information may then be stored in a specialized database, referred to as a vector database. In some embodiments, the vector database may be structured to allow for efficient querying and data retrieval, facilitating subsequent analysis and troubleshooting efforts. The vector database may be designed to store information in a way that makes it easier to identify patterns or trends over time, which could be invaluable for predictive analytics and preemptive action planning. By using the interruption recordation subsystem to determine, extract, and store information about instances of interruptions, the system may gain a robust framework for monitoring and improving the reliability of the RPA bot's operations.

In some embodiments, an interruption prediction subsystem may access the stored information related to instances of interruptions from the vector database, serving as the initial step for further analysis and could be triggered either manually or automatically based on predefined conditions or schedules. Upon accessing this information, the ML subsystem associated with the interruption prediction subsystem may be employed to analyze the data. In some embodiments, the ML subsystem may use machine learning algorithms to sift through the accessed information and identify patterns that are indicative of potential failures in the RPA bot's sequence of actions. As described herein, these algorithms could employ various machine learning techniques, such as classification, clustering, or regression analysis, to discern these patterns. Once the ML subsystem identifies patterns indicative of potential failures, the interruption prediction subsystem may output a predictive alert. The predictive alert may include the identified patterns and is specifically designed to flag potential failures associated with at least one action that the RPA bot has yet to execute. In some embodiments, the predictive alert may be sent to a monitoring dashboard for user review, or it could trigger automated corrective actions within the system.

In some embodiments, upon identifying patterns that are indicative of potential failures in the RPA bot's sequence of actions, the ML subsystem may take additional steps to cross-reference the identified patterns with historical data to determine if similar patterns have occurred before. In one aspect, this could involve querying a database of past incidents, errors, or anomalies to find matches or near-matches to the newly identified patterns. If a match is found, the ML subsystem may then consult a repository of applicable remedial actions that were effective in resolving similar issues in the past. These remedial actions could range from simple corrective measures like restarting a service to more complex solutions like modifying algorithmic parameters or rerouting tasks. Upon identifying the remedial actions, the ML subsystem may execute the remedial actions on the application server.

In some embodiments, the ML subsystem may be unable to identify a historical record that matches the identified pattern. In such cases, the system may include a self-healing subsystem that may serve as an automated response mechanism designed to implement pre-defined actions. To this end, upon receiving the predictive alert, the self-healing subsystem may temporarily pause the RPA bot's operations. Such a pause may serve as a safeguard, preventing the bot from executing actions that are flagged as likely to fail, thereby minimizing the exposure of actual failures and their associated costs or disruptions. Following the pause, the self-healing subsystem may automatically implement pre-defined actions on the application server to remedy the potential failures. In some embodiments, the pre-defined actions may range from simple tasks like restarting a service or clearing a cache, to more complex operations like rerouting tasks or modifying data inputs. Such actions may be designed to address the specific issues identified in the predictive alert and may be executed automatically without requiring human intervention. Once the pre-defined actions have been successfully implemented, the self-healing subsystem may be configured to resume the RPA bot's operations. The RPA bot may then be allowed to continue its sequence of actions, now with the problematic areas addressed and potential failures averted. By incorporating the self-healing subsystem that can pause, implement remedial actions (e.g., corrective measures), and resume the RPA bot's operations, the system may gain an additional layer of resilience. Such an automated response mechanism may enhance the overall reliability and efficiency of the RPA bot, reducing downtime and enabling more consistent performance.

In some embodiments, there may be instances where both the ML subsystem and the self-healing subsystem are unable to resolve an issue. Specifically, the ML subsystem may not find a historical match for the identified pattern of potential failure, and the self-healing subsystem's pre-defined actions may not effectively remedy the issue. In such scenarios, the workflow replication subsystem may be employed as a more granular approach to problem-solving.

As shown in block 306, the process flow includes extracting, using a fog computing subsystem, metadata associated with the execution of the sequence of actions, wherein the metadata comprises information associated with the instances of interruptions. As described herein, the fog computing subsystem may typically operate closer to the data source (e.g., application server), facilitating real-time or near-real-time data processing and analysis. In some embodiments, the metadata associated with the execution of the sequence of actions may include timestamps, status codes, error messages, or any other auxiliary information that may provide context to generation operational data. Additionally or alternatively, the metadata may include specific information that may provide insights into any disruptions or anomalies that may have occurred during the execution of the sequence of actions. By using the fog computing subsystem to extract metadata, including information related to instances of interruptions, the system may gain a valuable layer of contextual data that may be crucial for real-time monitoring, troubleshooting, and predictive analytics, thereby enhancing the overall reliability and efficiency of the RPA bot's operations.

As shown in block 308, the process flow includes simulating, using a workflow replication subsystem, a replication of the sequence of actions, wherein the replication of the sequence of actions comprises a replication of the instances of interruption. As described herein, the workflow replication subsystem may generate a virtual environment that may serve as a controlled environment where the sequence of actions can be tested and validated before being deployed in a live setting. In some embodiments, to simulate the controlled environment, the workflow replication subsystem may implement data mirroring to duplicate databases, file systems, and other data stores from the live environment so that the virtual environment has access to the same data as the live one, thereby making the simulation more accurate. Additionally or alternatively, the workflow replication subsystem may replicate system settings and configurations that are active in the live environment in the virtual environment. In some embodiments, the system settings may include network configurations, security settings, and any custom configurations that are specific to the RPA bot's operations. The workflow replication subsystem may also be configured to allocate resources to the virtual environment that closely mimics that of the live environment. For example, the resources may include CPU, memory, and storage capacities, as well as replicating any specialized hardware that might be in use. The workflow replication subsystem may also emulate, in the virtual environment, any external services or APIs that the RPA bot interacts with in the live environment. All events and transactions within the virtual environment are logged in a manner similar to the live environment. This enables a detailed comparison between the simulated and actual operations, aiding in the evaluation of the remedial actions. In specific embodiments, the workflow replication subsystem may collect performance metrics during the simulation, which can include execution time, error rates, and resource utilization.

In some embodiments, the replication of the sequence of actions may also include a replication of the instances of interruption that were identified in the original execution. As such, the workflow replication subsystem not only duplicates the standard operations of the RPA bot but also intentionally incorporates the disruptions or anomalies that were previously observed, thus allowing for a more comprehensive testing scenario, providing insights into how the system responds to both regular operations and irregular conditions. Further details regarding specific nature of the workflow replication subsystem are explained in FIG. 4.

As shown in block 310, the process flow includes troubleshooting, using an anomaly resolution subsystem, instances of interruptions in the execution of the sequence of actions based on at least simulating the replication of the sequence of actions. In some embodiments, by leveraging the simulated replication, the anomaly resolution subsystem may be configured to diagnose the nature and source of the interruptions. In doing so, the anomaly resolution subsystem may implement targeted corrective measures, whether those are automated actions or recommendations for manual intervention. Further details regarding specific nature of the deploying the remedial actions to the application server are explained in FIG. 5.

In some embodiments, the system may transmit control signals to a user input device, such as a computer monitor or a mobile device. These control signals may be designed to trigger the display of the predictive alert that may include information about potential failures in the RPA bot's sequence of actions. Upon receiving the predictive alert, the user input device may display the alert in a manner that is readily visible to the user. In one aspect, the alert may be in the form of a pop-up notification, an entry in a monitoring dashboard, or any other visual or auditory alert mechanism to ensures immediate attention. In scenarios where human expertise may be required to assess the situation, the user may take appropriate actions based on the information provided in the predictive alert. By incorporating the capability to transmit control signals for displaying predictive alerts on a user input device, the system may offer a flexible approach to handling potential failures. Such a feature may allow for human oversight and intervention, providing an additional layer of control and adaptability in managing the RPA bot's operations.

FIG. 4 illustrates a process flow 400 for isolating a potential failure using a workflow replication subsystem, in accordance with an embodiment of the invention. As shown in block 402, the process flow includes receiving the sequence of actions that the RPA bot is configured to execute. As described herein, the sequence of actions may refer to a predefined set of tasks or operations that the RPA bot is programmed to carry out on the application server. In example embodiments, these tasks could range from straightforward operations like data entry or file transfers to more complex activities like data analysis or decision-making based on specific conditions.

As shown in block 404, the process flow includes receiving information associated with the potential failure associated with the at least one action yet to be executed by the RPA bot. In some embodiments, the information associated with the potential failure may include various types of data such as error codes, warning messages, or other indicators that suggest a likelihood of failure in the upcoming actions. Receiving this specific information serves multiple purposes. First, it provides the system with early warning signs of potential issues, enabling preemptive measures to be taken before the RPA bot executes the problematic action. Second, it enriches the data set that the system has for analysis, thereby enhancing the accuracy and effectiveness of any troubleshooting or optimization efforts that follow.

As shown in block 406, the process flow includes identifying a specific location within the sequence of actions where the at least one action associated with the potential failure is situated. In some embodiments, the identify a specific location within the sequence of actions, the workflow replication subsystem may parse the received sequence of actions to understand the underlying structure. In embodiments where the sequence of actions is in textual format, the workflow replication subsystem may implement text parsing algorithms to identify the underlying structure. On the other hand, in embodiments where the sequence of actions is in the form of a complex data object, the workflow replication subsystem may implement object decomposition to identify the underlying structure. In some embodiments, the workflow replication subsystem may also analyze associated metadata, such as error codes or warning messages, to identify indicators of potential failure. To this end, the workflow replication subsystem may match the metadata against a database of known issues and their corresponding locations within typical action sequences.

Upon parsing the sequence of actions, the workflow replication subsystem may scan through the parsed sequence of actions to locate the specific action or actions associated with the received indicators of potential failure. In this regard, the workflow replication subsystem may implement pattern matching, keyword searches, or even more complex machine learning algorithms trained to recognize signs of specific types of failure. In some cases, the system may perform conditional checks to validate the identified location. For example, if an action is supposed to be executed only under certain conditions, the workflow replication subsystem may verify whether those conditions are met in the current or anticipated operational context. In some embodiments, the workflow replication subsystem may also cross-reference the identified location with historical data to confirm its accuracy. In this regard, the workflow replication subsystem may check whether similar failures have occurred at the same location in past executions of the same or similar sequences.

As shown in block 408, the process flow includes dividing the sequence of actions into at least two distinct components, wherein a first component comprises a sequence of actions up to and including the at least one action associated with the potential failure, and a second component comprises a sequence of actions subsequent to the at least one action. In some embodiments, the workflow replication subsystem may isolate the identified action or actions associated with the potential failure, segmenting the original sequence at this specific location. Following this isolation, the workflow replication subsystem may partition the sequence into two distinct components: the first component may include actions up to and including the identified potential failure, and the second component may include actions subsequent to the first component. To ensure the integrity of these components, the workflow replication subsystem may perform validation checks, which may include syntactic or semantic validation based on predefined rules. Additionally, relevant metadata such as error codes or warning messages may be associated with each component to facilitate subsequent analysis.

As shown in block 410, the process flow includes outputting the first component and the second component for further processing to the workflow replication subsystem to isolate and remedy the potential failure in the at least one action. This granular approach enhances the system's capability to isolate and resolve issues, thereby improving the overall reliability and efficiency of the RPA bot's operations.

FIG. 5 illustrates a process flow 500 for generating and subsequently deploying a server update to the application server, in accordance with an embodiment of the invention. As shown in block 502, the process flow may include determining, using the anomaly resolution subsystem, remedial actions configured to remedy the potential failures associated with the at least one action yet to be executed by the RPA bot. In some embodiments, the anomaly resolution subsystem may determine the remedial actions by querying a database of known issues and their corresponding actions, running algorithmic analyses to predict the efficacy of various remedial measures, incorporate user feedback to refine the remedial actions, implement rule-based decision trees to navigate through a set of predefined conditions and outcomes, employ heuristic methods based on best practices, expert input, or statistical models that weigh the likely success of various actions, use real-time monitoring data to inform its decision, run a comparative analysis of similar past incidents to determine which remedial actions were most effective in those cases, and/or the like.

As shown in block 504, the process flow includes simulating, using the workflow replication subsystem, an execution of the remedial actions. As described herein, the workflow replication subsystem may create a virtual environment that closely mimics the live environment in which the RPA bot functions (e.g., application server). Within this virtual environment, the workflow replication subsystem may simulate the execution of the identified remedial actions, allowing the system to assess the effectiveness of these actions without exposing adverse effects on the live operations.

As shown in block 506, the process flow includes determining whether the execution of the remedial actions remedy the potential failures associated with the at least one action yet to be executed by the RPA bot. In some embodiments, the system may employ a range of evaluation metrics to monitor the execution of the remedial actions during the simulation. In example embodiments, the evaluation metrics may include, but are not limited to, execution time, error rates, resource utilization, and/or the like. In specific embodiments, the system may also compare the simulated outcomes with expected outcomes based on historical data or predefined success criteria. In some instances, the system may run multiple iterations of the simulation, tweaking the remedial actions each time based on the results of the previous run. Such an iterative approach allows for fine-tuning of the remedial actions and increases the likelihood of identifying a successful solution.

In some embodiments, if the simulated remedial actions are found to be effective in resolving the potential failures, the system may categorize them for implementation in the live environment. Conversely, if the actions are determined to be ineffective or if they produce unintended consequences, the system may revert to the anomaly resolution subsystem for the identification of alternative remedial actions, and the simulation process may be repeated. By rigorously determining the effectiveness of the simulated remedial actions, the system ensures that only well-vetted solutions are implemented in the live environment, thereby enhancing the overall reliability and efficiency of the RPA bot's operations by minimizing the exposure of implementing ineffective or detrimental actions.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for intelligent workflow management in robotic process automation (RPA), the system comprising:

a workflow replication subsystem configured to replicate a sequence of actions executed by an RPA bot in an application server, wherein the workflow replication subsystem generates a virtual environment for controlling simulations, wherein the virtual environment replicates system settings, emulates external services and APIs, and implements data mirroring to mimic a live environment;

a fog computing subsystem operatively coupled to the workflow replication subsystem, wherein the fog computing subsystem is configured to extract metadata associated with execution of the sequence of actions, wherein the fog computing subsystem processes sensitive data locally to reduce processing of sensitive data in a centralized server;

an anomaly resolution subsystem operatively coupled to the fog computing subsystem and the workflow replication subsystem, wherein the anomaly resolution subsystem is configured to troubleshoot instances of interruptions in the execution of the sequence of actions, wherein the instances of interruptions comprise at least potential failures in at least one action yet to be executed by the RPA bot;

an interruption recordation subsystem operatively coupled to the application server, wherein the interruption recordation subsystem is configured to:

determine instances of interruptions in the execution of the sequence of actions by the RPA bot, wherein the instances of interruptions comprises at least an action did not execute as intended, an action is taking longer than expected to complete, and an action providing unexpected outputs;

extract information associated with the instances of interruptions, wherein the information associated with the instances of interruptions comprises metadata indicating an action where each instance of interruption occurred, a time of occurrence associated with each instance of interruption, a video recording of each instance of interruption, and a nature of an error, wherein the interruption recordation subsystem comprising a machine learning (ML) subsystem configured to, wherein the ML subsystem comprises an artificial neural network:

determine patterns indicative of potential failures in the execution of the sequence of actions by the RPA bot based on the information associated with the instances of interruptions;

query a database to determine if the patterns indicative of the potential failures associated with the at least one action yet to be executed by the RPA bot match historical anomalies and identify corrective actions based on the matched historical anomalies;

a self-healing subsystem operatively coupled to an interruption prediction subsystem, wherein the self-healing subsystem is configured to temporarily pause the RPA bot;

transmit control signals to a user input device to output a predictive alert comprising the patterns indicative of the potential failures associated with the at least one action yet to be executed by the RPA bot, wherein the predictive alert comprises a pop-up notification allowing for manual intervention;

determine, using the anomaly resolution subsystem, remedial actions configured to remedy the potential failures associated with the at least one action yet to be executed by the RPA bot based on real-time monitoring and the corrective actions, wherein the corrective actions comprise modifying algorithmic execution parameters of the RPA bot in the application server and clearing a cache;

simulate, using the workflow replication subsystem, an execution of the remedial actions in the virtual environment to prevent adverse actions in the live environment;

determine, using the anomaly resolution subsystem, whether the execution of the remedial actions remedy the potential failures associated with the at least one action yet to be executed by the RPA bot;

generate, using the anomaly resolution subsystem, a server update based on the remedial actions in an instance where the execution of the remedial actions remedies the potential failures;

implement automatically, using the self-healing subsystem, pre-defined actions on the application server to remedy the potential failures associated with the at least one action yet to be executed by the RPA bot;

deploy, using the anomaly resolution subsystem, the server update to the application server in the live environment to avoid any potential failures in the live environment; and resume, using the self-healing subsystem, the RPA bot upon implementing the pre-defined actions.

2. The system of claim 1, wherein the interruption recordation subsystem is configured to:

store the information associated with the instances of interruptions in a vector database.

3. The system of claim 2, wherein the ML subsystem is further configured to:

access the information associated with the instances of interruptions stored in the vector database.

4. The system of claim 3, wherein the interruption prediction subsystem is configured to transmit the control signals configured to cause the user input device to display the predictive alert for the manual intervention.

5. The system of claim 3, further comprising a workflow optimization subsystem operatively coupled to the interruption prediction subsystem and the workflow replication subsystem, wherein the workflow optimization subsystem is further configured to:

receive the sequence of actions that the RPA bot is configured to execute;

receive information associated with the potential failure associated with the at least one action yet to be executed by the RPA bot;

identify a specific location within the sequence of actions where the at least one action associated with the potential failure is situated;

divide the sequence of actions into at least two distinct components, wherein a first component comprises a sequence of actions up to and including the at least one action associated with the potential failure, and a second component comprises a sequence of actions subsequent to the at least one action; and output the first component and the second component for further processing to the anomaly resolution subsystem to isolate and remedy the potential failure in the at least one action.

6. A method for intelligent workflow management in robotic process automation (RPA), the method comprising:

receiving, from an application server, information associated with an execution of a sequence of actions by an RPA bot on the application server;

determining instances of interruptions in the execution of the sequence of actions, wherein the instances of interruptions comprise at least potential failures in at least one action yet to be executed by the RPA bot;

extracting, using a fog computing subsystem, metadata associated with the execution of the sequence of actions, wherein the metadata comprises information associated with the instances of interruptions, wherein the fog computing subsystem processes sensitive data locally to reduce processing of sensitive data in a centralized server;

simulating, using a workflow replication subsystem, a replication of the sequence of actions, wherein the replication of the sequence of actions comprises a replication of the instances of interruption, wherein the workflow replication subsystem is operatively coupled to the fog computing subsystem, wherein the workflow replication subsystem generates a virtual environment for controlling simulations, wherein the virtual environment replicates system settings, emulates external services and APIs, and implements data mirroring to mimic a live environment;

troubleshooting, using an anomaly resolution subsystem, instances of interruptions in the execution of the sequence of actions based on at least simulating the replication of the sequence of actions;

determining, using an interruption recordation subsystem, instances of interruptions in the execution of the sequence of actions by the RPA bot, wherein the instances of interruptions comprises at least an action did not execute as intended, an action is taking longer than expected to complete, and an action providing unexpected outputs, wherein the interruption recordation subsystem is operatively coupled to the application server;

extracting, using the interruption recordation subsystem, information associated with the instances of interruptions, wherein the information associated with the instances of interruptions comprises metadata indicating an action where each instance of interruption occurred, a time of occurrence associated with each instance of interruption, a video recording of each instance of interruption, and a nature of an error;

determining, using a machine learning (ML) subsystem associated with the interruption recordation subsystem, patterns indicative of potential failures in the execution of the sequence of actions by the RPA bot based on the information associated with the instances of interruptions, wherein the ML subsystem comprises an artificial neural network;

querying a database to determine if the patterns indicative of the potential failures associated with the at least one action yet to be executed by the RPA bot match historical anomalies and identify corrective actions based on the matched historical anomalies;

pausing temporarily, using a self-healing subsystem, the RPA bot, wherein the self-healing subsystem operatively coupled to an interruption prediction subsystem;

transmitting control signals to a user input device to output a predictive alert comprising the patterns indicative of the potential failures associated with the at least one action yet to be executed by the RPA bot, wherein the predictive alert comprises a pop-up notification allowing for manual intervention;

determining, using the anomaly resolution subsystem, remedial actions configured to remedy the potential failures associated with the at least one action yet to be executed by the RPA bot based on real-time monitoring and the corrective actions, wherein the corrective actions comprise modifying algorithmic execution parameters of the RPA bot in the application server and clearing a cache;

simulating, using the workflow replication subsystem, an execution of the remedial actions in the virtual environment to prevent adverse actions in the live environment;

determining, using the anomaly resolution subsystem, whether the execution of the remedial actions remedy the potential failures associated with the at least one action yet to be executed by the RPA bot;

generating, using the anomaly resolution subsystem, a server update based on the remedial actions in an instance where the execution of the remedial actions remedies the potential failures;

implementing automatically, using the self-healing subsystem, pre-defined actions on the application server to remedy the potential failures associated with the at least one action yet to be executed by the RPA bot;

deploying, using the anomaly resolution subsystem, the server update to the application server in the live environment to avoid any potential failures in the live environment; and resuming, using the self-healing subsystem, the RPA bot upon implementing the pre-defined actions.

7. The method of claim 6, further comprising:

storing, using the interruption recordation subsystem, the information associated with the instances of interruptions in a vector database.

8. The method of claim 7, further comprising:

accessing the information associated with the instances of interruptions from the vector database; and outputting a predictive alert comprising the identified patterns indicative of potential failures associated with at least one action yet to be executed by the RPA bot.

9. The method of claim 8, further comprising:

transmitting control signals to cause a user input device to display the predictive alert for manual intervention.

10. The method of claim 8, further comprising:

receiving the sequence of actions that the RPA bot is configured to execute;

receiving information associated with the potential failure associated with the at least one action yet to be executed by the RPA bot;

identifying a specific location within the sequence of actions where the at least one action associated with the potential failure is situated;

dividing the sequence of actions into at least two distinct components, wherein a first component comprises a sequence of actions up to and including the at least one action associated with the potential failure, and a second component comprises a sequence of actions subsequent to the at least one action; and outputting the first component and the second component for further processing to the anomaly resolution subsystem to isolate and remedy the potential failure in the at least one action.

11. A computer program product for intelligent workflow management in robotic process automation (RPA), the computer program product comprising a non-transitory computer-readable medium comprising code configured to cause an apparatus to:

receive, from an application server, information associated with an execution of a sequence of actions by an RPA bot on the application server;

determine instances of interruptions in the execution of the sequence of actions, wherein the instances of interruptions comprise at least potential failures in at least one action yet to be executed by the RPA bot;

extract, using a fog computing subsystem, metadata associated with the execution of the sequence of actions, wherein the metadata comprises information associated with the instances of interruptions, wherein the fog computing subsystem processes sensitive data locally to reduce processing of sensitive data in a centralized server;

simulate, using a workflow replication subsystem, a replication of the sequence of actions, wherein the replication of the sequence of actions comprises a replication of the instances of interruption, wherein the workflow replication subsystem is operatively coupled to the fog computing subsystem, wherein the workflow replication subsystem generates a virtual environment for controlling simulations, wherein the virtual environment replicates system settings, emulates external services and APIs, and implements data mirroring to mimic a live environment;

troubleshoot, using an anomaly resolution subsystem, instances of interruptions in the execution of the sequence of actions based on at least simulating the replication of the sequence of actions;

determine, using an interruption recordation subsystem, instances of interruptions in the execution of the sequence of actions by the RPA bot, wherein the instances of interruptions comprises at least an action did not execute as intended, an action is taking longer than expected to complete, and an action providing unexpected outputs, wherein the interruption recordation subsystem is operatively coupled to the application server;

extract, using the interruption recordation subsystem, information associated with the instances of interruptions, wherein the information associated with the instances of interruptions comprises metadata indicating an action where each instance of interruption occurred, a time of occurrence associated with each instance of interruption, a video recording of each instance of interruption, and a nature of an error;

determine, using a machine learning (ML) subsystem associated with the interruption recordation subsystem, patterns indicative of potential failures in the execution of the sequence of actions by the RPA bot based on the information associated with the instances of interruptions, wherein the ML subsystem comprises an artificial neural network;

query a database to determine if the patterns indicative of the potential failures associated with the at least one action yet to be executed by the RPA bot match historical anomalies and identify corrective actions based on the matched historical anomalies;

pause temporarily, using a self-healing subsystem, the RPA bot, wherein the self-healing subsystem operatively coupled to an interruption prediction subsystem;

transmitting control signals to a user input device to output a predictive alert comprising the patterns indicative of the potential failures associated with the at least one action yet to be executed by the RPA bot, wherein the predictive alert comprises a pop-up notification allowing for manual intervention;

determine, using the anomaly resolution subsystem, remedial actions configured to remedy the potential failures associated with the at least one action yet to be executed by the RPA bot based on real-time monitoring and the corrective actions, wherein the corrective actions comprise modifying algorithmic execution parameters of the RPA bot in the application server and clearing a cache;

simulate, using the workflow replication subsystem, an execution of the remedial actions in the virtual environment to prevent adverse actions in the live environment;

determine, using the anomaly resolution subsystem, whether the execution of the remedial actions remedy the potential failures associated with the at least one action yet to be executed by the RPA bot;

generate, using the anomaly resolution subsystem, a server update based on the remedial actions in an instance where the execution of the remedial actions remedies the potential failures;

implement automatically, using the self-healing subsystem, pre-defined actions on the application server to remedy the potential failures associated with the at least one action yet to be executed by the RPA bot;

deploy, using the anomaly resolution subsystem, the server update to the application server in the live environment to avoid any potential failures in the live environment; and resuming, using the self-healing subsystem, the RPA bot upon implementing the pre-defined actions.

12. The computer program product of claim 11, wherein the code further causes the apparatus to:

store, using the interruption recordation subsystem, the information associated with the instances of interruptions in a vector database.

13. The computer program product of claim 12, wherein the code further causes the apparatus to:

access the information associated with the instances of interruptions from the vector database; and output a predictive alert comprising the identified patterns indicative of potential failures associated with at least one action yet to be executed by the RPA bot.

14. The computer program product of claim 13, wherein the code further causes the apparatus to:

transmit, using the interruption prediction subsystem, the control signals to cause the user input device to display the predictive alert for the manual intervention.

15. The computer program product of claim 13, wherein the code further causes the apparatus to:

receive the sequence of actions that the RPA bot is configured to execute;

receive information associated with the potential failure associated with the at least one action yet to be executed by the RPA bot;

identify a specific location within the sequence of actions where the at least one action associated with the potential failure is situated;

divide the sequence of actions into at least two distinct components, wherein a first component comprises a sequence of actions up to and including the at least one action associated with the potential failure, and a second component comprises a sequence of actions subsequent to the at least one action; and output the first component and the second component for further processing to the anomaly resolution subsystem to isolate and remedy the potential failure in the at least one action.

* * * * *